ANTENNA WITH ELECTRICALLY VARIABLE REFLECTOR

Original Filed Oct. 4, 1961 3 Sheets-Sheet 1

ANTENNA WITH ELECTRICALLY VARIABLE REFLECTOR

Original Filed Oct. 4, 1961 3 Sheets-Sheet 2

INVENTOR.
ROBERT G. MALECH
BY Darby & Darby
ATTORNEYS

ANTENNA WITH ELECTRICALLY VARIABLE REFLECTOR

Original Filed Oct. 4, 1961 3 Sheets-Sheet 3

INVENTOR
ROBERT G. MALECH
BY Darby & Darby
ATTORNEYS

United States Patent Office

Re. 28,217
Reissued Oct. 29, 1974

28,217

ANTENNA WITH ELECTRICALLY VARIABLE REFLECTOR

Robert G. Malech, Plainview, N.Y., assignor to New England Merchants National Bank, Boston, Mass.

Original No. 3,259,902, dated July 5, 1966, Ser. No. 143,276, Oct. 4, 1961. Application for reissue May 6, 1968, Ser. No. 731,354, which is a continuation of abandoned reissue application Ser. No. 663,459, Aug. 16, 1967

Int. Cl. H01q *3/26*

U.S. Cl. 343—754 5 Claims

Matter enclosed in heavy brackets [ ] appears in the original patent but forms no part of this reissue specification; matter printed in italics indicates the additions made by reissue.

*ABSTRACT OF THE DISCLOSURE*

*An electronically steerable antenna formed by an array of separate reflector units of controllable electrical path length each for receiving energy from a source which is reflected back at a phase corresponding to the electrical path length of each unit.*

*This application for reissue patent is a continuation of my copending application for reissue patent Ser. No. 663,459, filed Aug. 16, 1967, now abandoned which is assigned to the same assignee.*

The present invention relates to radio frequency antennas and particularly such antennas comprising a central feed element and a reflector assembly having a relatively large number of elemental antennas each with an associated phase shifter and/or attenuator and arranged to cause an incoming electromagnetic wave front to have respective portions thereof altered in phase or amplitude or both and to be reflected back to the feed element where it may be effectively collected for utilization in a radio receiver, radar receiver or the like. In a particularly advantageous form, the reflector assembly is electrically controllable to provide desired alterations in the electromagnetic wave front and hence in the antenna characteristics.

Large-aperture antennas may be classified into two categories, reflectors or arrays; each of these two categories possesses distinct advantages and disadvantages with respect to the other. Some characteristics of reflectors as compared to arrays are summarized below.

Reflectors characteristically have a shaped surface, often parabolic. Arrays may be formed with either a shaped surface or a planar surface and often are provided with a planar surface for simplicity of construction.

Reflectors are characteristically less expensive than the much more expensive antenna arrays which generally require a complex multiple-branched feed system.

Reflectors generally provide only a single beam whereas arrays may readily be designed to provide multiple beams. Conventional reflectors may be scanned only by mechanical means whereas arrays may be, and often are, electrically scanning.

The conventional reflector has no side lobe or beam shape control while arrays may be designed with side lobe and beam shape control.

In a reflector antenna the receiver is connected solely to the feed element whereas an array can be provided with numerous receivers up to a limit of one receiver per element.

Reflectors are well suited for very large apertures while arrays tend to have excessive line losses as the aperture size is increased.

The invention disclosed herein will be seen to combine in one system advantages described above and other advantages which were previously found in only one or the other of the two categories of antennas discussed.

Apparatus according to the invention is characterized by the following mode of operation; energy (a signal) is received by each of the many elements in an array, processed through phase and/or amplitude control, reflected back by a shorting plate, retransmitted through elemental antennas, and collected by a signal (or a few) secondary antenna.

In addition to providing the previously described features and advantages it is an object of the present invention to provide an antenna including a reflector which is capable of causing a predetermined change in the wave front of an electromagnetic wave reflected by it by means of individually determinable changes of phase or amplitude imparted to respective portions of the wave front by respective elemental reflector units.

It is another object of the present invention to provide an antenna of the foregoing type wherein the wave front shape is subject to being rapidly varied by virtue of electrical control of the reflector units.

It is yet another object of the present invention to provide an antenna of the foregoing type which also includes a multiple-branched feed system selectively connectable to the elemental reflector units thus forming an antenna array, and a further different mode of operation of the system.

It is still another object of the present invention to provide an antenna of the foregoing type wherein the reflector comprises a rectangular array composed of numerous rectangular waveguide horn antennas each having associated therewith a phase controller and attenation controller toegther with a short circuiting element to cause reflection of any signal received by a waveguide horn so that it will be reflected through the waveguide to be retransmitted with predetermined phase and amplitude relation for each portion thereof.

Other objects and advantages will be apparent from a consideration of the following description in conjunction with the appended drawings in which.

Figure 1:
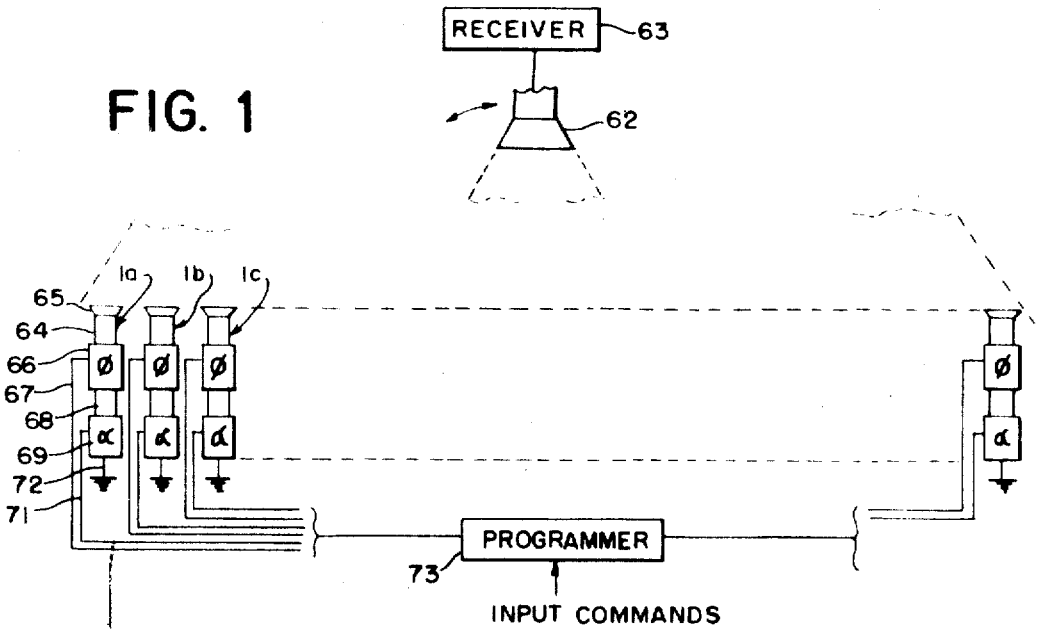
FIGURE 1 is a fragmentary top view, partially schematic in form, of an antenna system according to the present invention.
Figure 2:
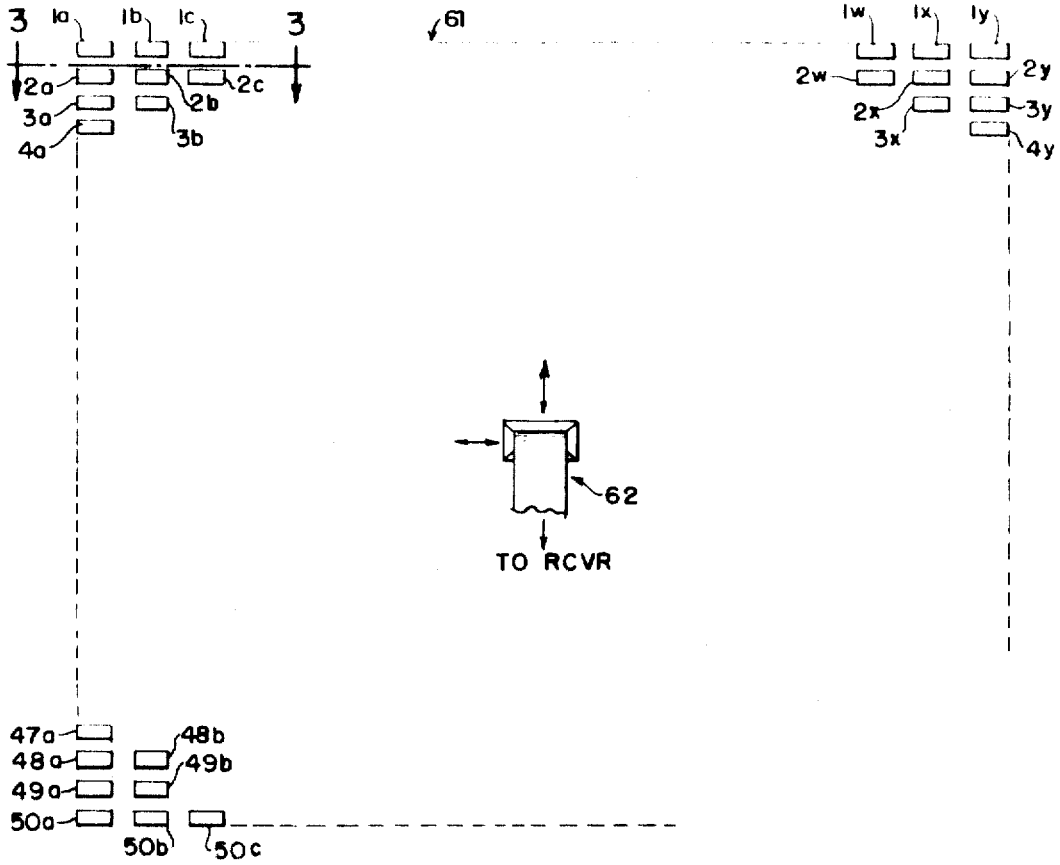
FIGURE 2 is a front elevational view, also partially schematic, of the apparatus of FIGURE 1.

Referring now to the drawings and particularly to FIGURES 1 and 2, a rectangular array of elemental reflector units 1a–50a through 1y–50y is arranged to form a screen or reflector 61. Thus in the particular embodiment illustrated the total reflector surface comprises 25 columns and 50 rows of elemental reflector units. Obviously, the number and arrangement of the elemental reflectors can be varied to suit each particular case.

A feed element 62 is provided to feed electromagnetic energy to or collect electromagnetic energy from the reflector 61. The feed element is preferably placed on a perpendicular from the center of the reflector 61 and a distance "L" in front of the reflector array 61 such that the longest side of the array "D" is from two to four times "L." the distance "L" may be selected in accordance with customary antenna design principles and will generally be such that the extremals of the reflector array 61 will intersect the radiation pattern of the feed element 62 at approximately the −10 db points.

It should be pointed out that antennas according to the present invention are reciprocal devices. That is, the antenna system operates in substantially the same manner for transmission and reception. For the sake of clarity the emphasis will be placed on the operation of the antenna when used as a receiver.

As seen in FIGURE 1 for example, each elemental reflector unit comprises a rectangular horn antenna 65 mounted at the end of a rectangular waveguide section 64. Since all of the elemental reflector units are effectively of similar construction, the reference numbers for the component parts of the elemental reflector units are shown only for unit 1a, it being understood that other elemental reflector units will comprise similar components.

In the particular embodiment illustrated, the horn antennas 65 are arranged in a common plane perpendicular to the axis of the feed element 62. This is a desirable arrangement from the point of view of mechanical simplicity and since the effective shape of the reflector surface is controllable apart from the placement of the rectangular horn antennas 65, these antennas can be arranged in any configuration desired without affecting the operation of the system.

The rectangular waveguide 64 feeds into a phase control element 66, which may be one of any of many known types of mechanically or electrically adjustable phase controllers (for example Rantec Phase Shifter Model PX–101).

Another rectangular waveguide 68 is connected to the other end of phase controller 66 to provide a transmission path from phase controller 66 to a variable attenuator 69. Numerous such attenuators are available, one suitable form being Rantec Amplitude Modulator Model MX–102. Phase controller 66 and variable attenuator 69 are preferably electrically controllable and electrical leads 67 and 71 respectively are provided for the control of phase controller 66 and variable attenuator 69. While the fullest advantage of the apparatus according to the present invention is achieved by providing electrically controllable phase control and attenuation, it is obvious that where this degree of flexibility is not required predetermined constant phase shift or attenuation elements can be utilized. It should also be appreciated that in some cases no control of attenuation or in fact no attenuation at all may be desired in which latter case the attenuators 69 may be dispensed with altogether.

The variable attenuators 69 are terminated by a short circuit 72 which may comprise any suitable means for short-circuiting the transmission path and in a typical case may be a shorting bar across the waveguide transmission line.

From the explanation of the apparatus thus far presented, it will be seen that a wave front of electromagnetic radiation which impinges upon the array of elemental reflector units is effectively broken down into a number of separate signals received by the horn antenna 65 of each elemental reflector unit.

Each such signal is transmitted through phase controller 66 and attenuator 69 and is reflected to retraverse these elements again and be transmitted from the rectangular horn antenna elements 65. In this process the reradiated wave front may be shaped in virtually any desired fashion by appropriate control of the phase control element 66 and attenuators 69. For example, the same effective shaping of the wave front could be accomplished as would be accomplished by a paraboloidal reflector if desired. The received wave front is reflected into the feed element 62 from which it is transmitted to a receiver 63.

A programmer 73 is provided to transmit the appropriate control signals to the respective phase controllers 66 and attenuators 69. The programmer will thus be electrical apparatus of conventional design adapted to transmit a plurality of signals over separate transmission paths each having a respective predetermined value and to perform this function in response to one or more input commands.

Figure 3:
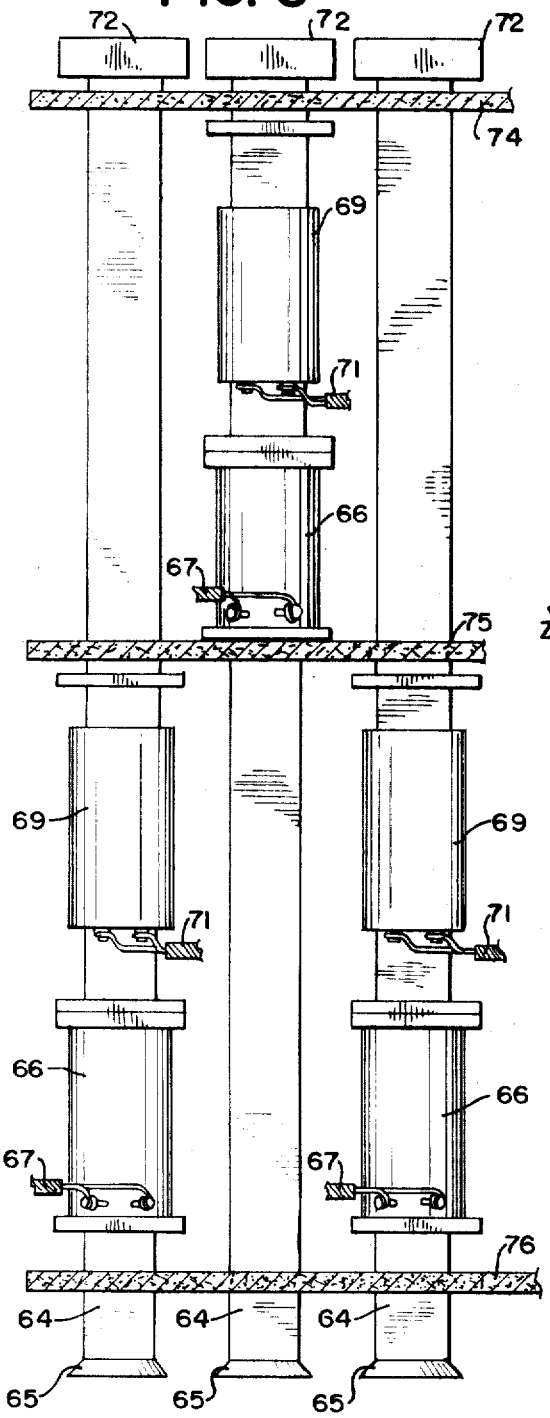
FIGURE 3 is an enlarged detailed view of the apparatus of FIGURES 1 and 2 taken along the line 3—3 in FIGURE 2.

While design of suitable physical arrangements of the elements of FIGURES 1 and 2 would present no difficulty to one of skill in the art, a particularly compact and efficient arrangement is shown in FIGURE 3. It will be noted in FIGURE 3 that the phase controllers 66 and variable attenuator 69 are placed in a staggered arrangement so that they may be more compactly arranged and access thereto may be more convenient. The structure is otherwise as schematically illustrated in FIGURE 1 and similar components of the elemental reflector units are given corresponding numbers in FIGURE 3.

The structural support for the elemental reflector units may be provided by sheets of rigid material 74, 75 and 76 provided with openings to accommodate rectangular waveguide sections such as 64. As an example, fibreglass reinforced sheets of resinous or plastic material would be suitable for supports 74 and 75. Support 76 may be formed in whole or in part by electrically resistive microwave absorbing material in order that all reflections other than the desired reflected signals out of horn antennas 65 will be eliminated. Alternatively the sheet 76 may be transparent to electromagnetic radiation of the wavelength involved but desirably it should be nonreflective where there is any possibility of radiation passing between horns 65 and reflecting from sheet 76. Of course, in some cases the horns may be arranged so close together that they will effectively intercept all radiation impinging thereon.

As previously explained the horn antennas 65 could be arranged in other than a planar configuration and in special cases a paraboloidal or spherical configuration might have advantages. It will be apparent, however, that the structural simplicity of the planar arrangement illustrated in FIGURE 3 will be highly desirable in many cases. For example, such an arrangement could be placed on the flat roof of a large building with a minimum of structural support required.

Although the operation of the antenna system has not as yet been rigorously and analytically explained, it can be appreciated from the explanation thus far presented that an antenna is provided wherein the effective shape of the reflector can be controlled within wide limits by transmission of appropriate signals to a large number of elemental reflector units. The function of providing the appropriate signals may be carried out by a programmer 73 which need only be instructed by an input command as to which of several effective shapes are desired to provide a particular beam pattern or wave front shape.

As an example, suppose the phase controllers are set to produce a parabolic phase front. The system would then operate in a manner comparable to a parabolic reflector and feed element. It may be observed that the antenna according to the present invention has numerous advantages, however, over a fixed-reflector parabolic antenna.

First, the phase shifters can be set to within several electrical degrees of phase shift so that in the event of inaccuracies in the construction of a large array or distortions due to weight or the like, correction of the effective shape may be made electrically. As a result the need for close tolerance control in the construction of a large antenna may be eliminated.

Second, additional control is provided by the variable attenuators which can be set to minimize the beam width side lobe product, or to produce any other desired beam configuration.

Third, the amplitude and phase fronts can be set to produce the desired beam shape in each plane independent of the other.

Fourth, where used for example to track a moving target by radar, the phase front can be changed from parabolic (which focuses an infinite point at the feed and is useful for search mode of operation) to an elliptical front (which will focus the target, which is closer than an infinite point, at the feed and is useful for a track mode of operation).

Finally, since electronic phase controllers and attenuators can be rapidly varied, the phase front and beam shape can be continuously, rapidly, and accurately controlled to produce optimum system performance independent of range, position of target, size of target, velocity, and numbers of targets, where the antenna is used in a radar application.

As previously suggested, antennas according to the present invention are useful generally for systems requiring a shaped beam. It should also be pointed out that the invention has particular utility for large fixed antennas built for radio astronomy or other purposes by virtue of the fact that the electrical surface can be changed at will whereas in the conventional antenna the shape, once determined is thereafter invariable. Thus such an antenna made according to the present invention could be effectively varied from parabolic to spherical or could in fact be controlled to provide two or more paraboloids or spheres for special purposes. There is the further advantage that the feed element may be moved off the physical axis of the reflector and the reflector may be "electrically tilted" to maintain an effective axial position relation for the feed element. It may thus be desirable to render the feed element movable as indicated by the arrows in FIGURE 2.

Still further uses for the puresent invention will be apparent to those skilled in the art from the following more analytical description of the operation of the apparatus which will also be of aid in indicating variations in the design. While the theoretical analysis presented is believed correct, the operability of the invention is not dependent on the accuracy of the analysis and the scope of the invention is not to be construed to be limited thereby.

To describe the theory of operation in detail, it is desirable to refer to specific components. The components that are described are not new and are not necessarily included as part of the invention. The invention is capable of use over the whole microwave spectrum, but a specific frequency is chosen for clarity in the example. Finally, the shape of the array and number of elements in the array can vary within the scope of the invention. Again, however, for clarity a flat rectangular array has been chosen for the example.

The programmer 73 represents or requires no novel design, but merely requires apparatus of known type which transmits a plurality of signals of different values over respectively different paths in response to a selectable command signal. Furthermore, the invention does not require the use of a programmer, but rather, fixed phase shifters (e.g. lengths of transmission line) and fixed attenuators could be used, where appropriate to achieve the desired result. However, making the phase shifters and amplitude attenuators variable greatly increases the utility of the apparatus by allowing for rapid beam shaping, beam scanning and variable (say elliptical) phase front range tracking.

This explanation will consider an apparatus designed to have the same effect on a vertically polarized horn as a cylindrical parabola, i.e. the wave front appears to be a plane wave.

Consider energy entering the horn at some oblique angle. For a given source intensity, the field intensity at the horn will vary depending on the angle of incidence to the horn. Consider a ray on the axis of the horn.

Consider the field intensity on the normal to the center of the array, at the plane of the array to be:

$$E_s=\frac{2E_z}{k}\epsilon^{-J\beta\frac{k}{2}}$$

Where:

$E_S$=the magnitude of the electric field intensity at the centerline of the array.

$E_Z$=is constant depending on the size of the feed antenna and the dielectric constant of free space.

k=the distance from the centerline of the array to the end.

$\beta$=phase constant of propagation.

$E_H$=magnitude of the electric field intensity, at any point on the aperture, due to the feed antenna.

$E_{Hr}$=the electric field intensity $E_H$ after the waveguide and phase shifter have operated on it.

P=arbitary constant.

The field intensity at the aperture of any horn is:

$$E_h=E_z f(\theta)\epsilon^{-J\beta r},\ r=\sqrt{y^2+\frac{k^2}{4}}$$

where f(e) depends on the field pattern of the individual horn at the frequency in question and on the space attenuation the field undergoes. (The array is in the far field of the feed horn.)

The field that enters the horn is shifted in phase by the phase shifter in each direction. The intensity of the field as it leaves the horn is:

$$E_{Hr}=E_Z f(\theta)\epsilon^{-J(\beta r+\phi(y))}$$

where $\phi(y)$ is the total phase shift introduced by the waveguide and phase shifter. For an equiphase field distribution across the aperture of the array the following condition must be imposed on $\phi(y)$.

$$\beta+\phi(y)=\text{CONSTANT}=P$$

This can be accomplished by adjusting the variable phase shifter in each waveguide.

Figure 4:
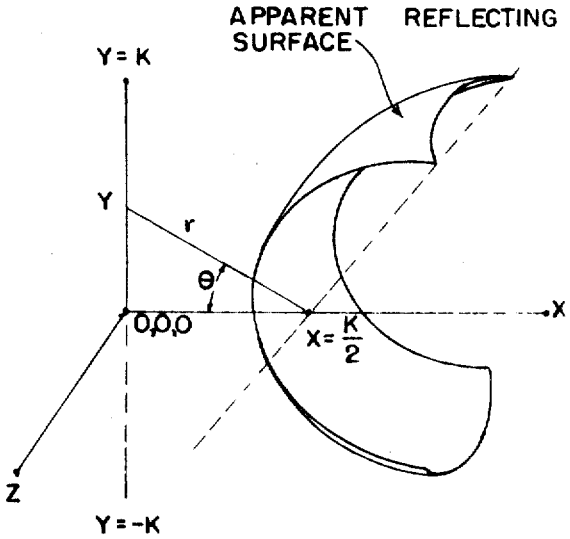
FIGURE 4 is a three-dimensional representation of the apparent reflecting surface provided in one embodiment of the present invention and presented to aid in the explanation of the operation of apparatus according to the invention.

Considering the field pattern of each horn to be the cos $\theta$ function in the plane of interest (H plane), since the far field magnitude decreases as I/r $$f(\theta)=\frac{\cos\theta}{r}=\frac{2\cos^2\theta}{k}$$

the magnitude of the field leaving the horn can now be written as $$E_{Hr}=\frac{2E_Z}{k}\cos^2\theta$$

where k and $\theta$ are defined in FIGURE 4.

In this example, the apparatus consists of a rectangular array of 25 rows parallel to the z axis with 50 horns in each row. See FIGURE 2.

It is desirable to know the total power absorbed by the phase shifters that are programmed to give desired wave fronts, in this example a plane wave front. Recall the desired equation for the required phase shift in each waveguide:

$$\phi(y)=P-\beta\left(y^2+\frac{k^2}{4}\right)^{1/2}$$

Since P is an arbitrary constant it can be set equal to zero, so $$\phi(y)=-\beta\left(y^2+\frac{k^2}{4}\right)^{1/2}$$

The spacing between waveguides is d, hence k equals 25d. The phase shift required in a horn in column h is $$\phi(y)_L=-\frac{2\pi}{\lambda}\left[\left(L-\frac{1}{2}\right)^2d^2+\left(\frac{25}{2}\right)^2d^2\right]^{1/2}$$

$$=-\frac{2\pi d}{\lambda}\sqrt{\left(L-\frac{1}{2}\right)^2+156}$$

From the calibration curve of a typical phase shifter Rantec Model PX–101 the current needed through the 200 ohm. control coil for a given phase shift is half of that specified by the above formula since the wave passes through the device twice, and the power absorbed by this phase shifter can be readily calculated.

For example, at 8.85 gc. the total power delivered to all the phase shifters is 490 watts.

The aperture distribution of the apparatus illustrated is almost a complete cosine squared function. This type of aperture function gives a larger beamwidth than if the intensity were a constant. For this array the cosine squared function yields a half power beamwidth of 0.03 radian while that of the constant function is 0.018 radian. The first side lobe intensity for the cosine squared function is 32 db down while that of the constant function is 13.2 db below the peak of the main beam. To make the aperture field function a constant, requires that the attenuators 66 be adjusted so that they operate on the incoming wave with a secant squared function. (Secant $\theta$ attenuation in each direction.) The resultant aperture field intensity function would then be rendered constant.

The largest value $\theta$ takes on in this example is Arctan $2=63.5°$ and $\cos^2 63.5$ equals 0.2. Therefore this will be the relative level to which the field magnitude across the rest of the aperture will be attenuated. The expression for the field intensity will now be:

$$E_{Hr}=\frac{2}{k}E_Z(\cos^2\theta)(0.2\ \sec^2\theta)$$
$$=\frac{0.4}{k}E_z$$

where 0.2 sec.$^2$ $\theta$ is the attenuator function. To determine the D.C. power absorbed by all the attenuators, an approach similar to that used for the phase shifting devices can be employed.

The technique of flattening the field intensity across the aperture decreases the beam width by a factor of 1.65 to 1.

An alternative to attenuating the middle of cosine squared aperture function would be to amplify the ends of the function with bilaterial amplifiers in place of the attenuators. Using the attenuators, the RF power absorbed in the aperture (in this example) is 9.7 db lower than it would be if the cosine squared distribution was used; this loss would be effectively avoided by the use of amplifiers as proposed above.

Antenna apparatus according to the invention is adapted to radar systems. In a typical case there would be attached to the feed antenna a standard radar transmitter-receiver and range tracker monitored by a computer to program the antenna apparatus to form any desired effective reflecting surface by controlling the phase shifters 66 and attenuators 69. As an example of one useful program, for general tracking the reflecting surface would be parabolic (i.e. an ellipse with the second focus at infinity). Once an object of interest is detected its position is determined by the range tracker and the computer reprograms the antenna to an elliptical reflector whose distant focus is now at the position where the object of interest is located. Hence a maximum amount of available power is being used to observe a distant object so that the range at which it can be detected is now greatly increased.

One of the advantages of the present invention is that it does away with the necessity for a complicated corporate feed system involving a multiply-branched system of feed lines which is commonly used in a large antenna array. In special cases, however, it may be desirable to combine the present invention with such a directly fed antenna array. In such a case, one or more short circuits controllable electrically or otherwise would be placed in the feedlines to the array elements; an auxiliary feed element would also be placed in front of the array to transmit energy to impinge against the array. Thus when the feed element and the short circuit elements were activated the antenna system would operate according to the present invention as previously described, and alternatively the arrangement could be operated as a conventional multi-element transmitting or receiving array.

Figure 5:
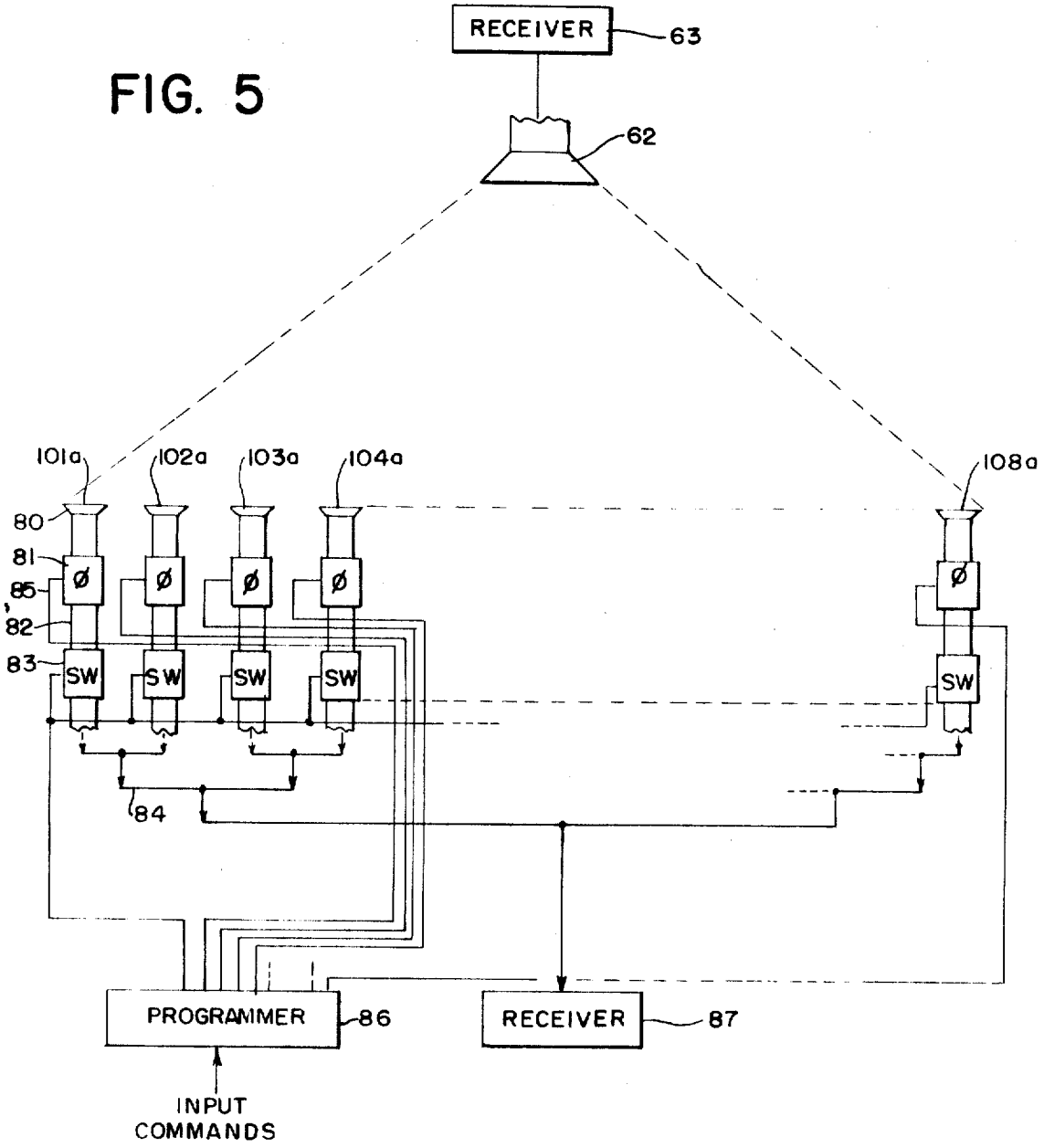
FIGURE 5 is a fragmentary top view partially schematic in form, of an alternative form of apparatus according to the invention.

Such an alternative form of invention is illustrated in FIGURE 5 in partially schematic form. A plurality of elemental phasing units 101a through 108a are arranged to provide an antenna array or reflector assembly depending upon the mode of operation of the apparatus. Only one row of elemental phasing units 101a–108a is illustrated but it will be appreciated that in the usual case a two-dimensional array such as illustrated in FIGURE 2 will be provided. Also the number of elemental phasing units in the row is illustrated as eight, but a different number may be provided as required. Each of the elemental phasing units 101a–108a is formed of similar components and accordingly only unit 101a will be described and it will be understood that the description thereof and the reference numbers thereon will also apply to the other units.

Unit 101a includes an antenna 80 which is connected to a phase control element 81 so that a signal received at antenna 80 is transmitted to phase control element 81 which subjects it to a phase shift which is controllable, preferably electrically, in response to a signal transmitted to the phase controller through line 85 from programmer 86.

The phase controller 81 is connected by a suitable transmission path 82 to an electrically controlled radio frequency switch 83. Switch 83 may comprise a diode placed in the waveguide or other transmission line and provided with appropriate bias and signal voltages in accordance with techniques well known in the art and described for example in U.S. Patent No. 2,908,813 to R. F. Morrison, Jr.

In a first operative condition switch 83 short circuits transmission path 82 to cause the signal received by antenna 80 to be reflected and reradiated from antenna 80 (after again passing through phase control element 81). Thus it will be seen that with switches 83 in the first operative condition, the operation of the apparatus of FIGURE 5 is substantially that previously described for FIGURES 1–3. For simplicity the attenuation control elements 69 have been omitted in the apparatus of FIGURE 5, but it will be understood that they could readily be incorporated in this apparatus and may conveniently be combined with switches 83.

Since the operation of the apparatus for the short circuit condition of switches 83 is substantially as previously explained for FIGURES 1–3, it will not be explained in detail, but it will suffice to say that the arrangement of elemental antenna units effectively provide a reflector having an electrically controllable shape for modifying the wave form shape, beam pattern, etc. of an electromagnetic wave transmitted from or received at feed element 62.

In its second operative condition, switch 83 provides a substantially unimpeded transmission path for signals transmitted through transmission path 82 so that transmission path 82 is effectively connected to a multiply-branched feed system 84 which serves to connect the various elemental antenna units with a receiver 87. Accordingly with switch 83 in the transmissive condition, an antenna array is provided connected by a multiply-branched feed system to a receiver 87.

Programmer 86 is effective to control the beam characteristic in either mode of operation of the system of FIGURE 5, and also controls switching of the system from one mode to another. It may be noted that phase control elements 81 are substantially twice as effective when the system is in the reflector mode of operation by virtue of the fact that the signal passes through the phase control elements 81 twice (once in each direction).

In FIGURE 5, it will be noted that two receivers 87 and 63 are shown and in some cases it will be desirable to thus provide separate receivers (or separate transmitters, or a transmitter and a receiver) for each mode of operation of the system. Obviously, a single receiver or transmitter or other utilization device could be connected both to feed element 62 and multiply-branched feed structure 84. If desired a switch could be provided for selective connection of the receiver to elements 84 and 62 and such a switch could be controlled by programmer 86.

From the foregoing explanation it will be seen that FIGURE 5 shows an alternative embodiment of the invention in which an antenna array is provided having a multiply-branched feed system, and wherein the same structure with relatively few additional elements is provided with a second mode of operation wherein an electrically controllable reflector type antenna is provided. Thus the advantages of a reflector antenna system may be provided selectively for certain operations in the cycle of operations of the apparatus. As an example, line losses in a multiply-branched feed system often become a limiting factor, and the system of FIGURE 5 may therefore be arranged to utilize the reflector mode of operation during a search phase in a radar system until a target has been acquired. After acquisition the target information processing and tracking may be better accomplished by use of the antenna array mode of operation.

It will be understood that the comments with respect to variations and the theory of operation discussed in connection with FIGURES 1–3 are generally applicable to the apparatus of FIGURE 5, and, while not repeated, should be considered to be incorporated in the description of the embodiment of FIGURE 5.

From the foregoing explanation it will be appreciated that according to the present invention an antenna system is provided which combines features of previous systems characterized by reflectors or arrays and, to a considerable extent, obtains the advantages of both.

Several variations and modifications of the specific system described have been suggested, but it will be appreciated that numerous other variations and modifications will be apparent to those of skill in the art and it is accordingly desired that the scope of the invention not be limited to those specific embodiments shown or suggested but that it be limited solely by the appended claims.

What is claimed is:

1. A radio frequency antenna system comprising a reflector assembly; a feed element directed toward the center of said assembly and spaced therefrom a distance between approximately one-half and one-quarter the maximum dimension of said assembly; a radio frequency transmission line connected to said feed element and adapted to be connected to antenna utilization apparatus, said assembly comprising a plurality of elemental reflector units each having a rectangular horn antenna, an electrically controllable phase control element connected to said horn antenna by waveguide transmission line to modify a signal received by said horn antenna, and signal reflecting means connected to receive the modified signal from said horn antenna and phase control element and return it for transmission from said horn antenna; and means for transmitting a set of control signals to the respective phase control elements to provide predetermined phase shifts of respective portions of the wave front impinging on said reflector assembly.

2. A radio frequency antenna system comprising a reflector assembly; a feed element directed toward the center of said assembly and spaced therefrom a distance between approximately one-half and one-quarter the maximum dimension of said assembly; a radio frequency receiver, a radio frequency transmission line connected between said feed element and said receiver, said assembly comprising a substantially coplanar rectilinear array of at least 100 elemental reflector units each having a rectangular horn antenna, an electrically controllable phase control element and an electrically controllable signal amplitude control element serially connected by waveguide transmission line to said horn antenna to modify a signal received by said horn antenna, and signal reflecting means connected to receive the modified signal from said horn antenna phase control and amplitude control elements and return it to said horn antenna for transmission from said horn antenna; and means for transmitting a set of control signals to the respective phase control elements and amplitude control elements to provide predetermined phase shifts and amplitude changes of respective portions of the wave front impinging on said reflector assembly.

3. A radio frequency antenna system comprising an array of a plurality of elemental antennas, a multiply-branched transmission line adapted to connect said elemental antennas to a utilization device, respective phase-shift elements connected to each elemental antenna, a feed element directed toward said array and adapted to be connected to a utilization device, means for creating a short circuit at each said phase-shift element and effectively disconnecting said transmission line from said elemental antennas whereby said short circuiting and disconnection effectively coverts said antenna system from an antenna array having a multiply-branched transmission line feed to an antenna of the reflector-feed element type.

*4. A scanning antenna system including a signal feed and a reflecting surface; said reflecting surface formed of a plurality of radiating elements; said radiating elements operatively positioned with respect to said signal feed to present a wave signal therebetween; a plurality of branch signal channels; said radiating elements positioned at a first end region of said branch signal channels; said first end regions collectively defining said reflecting surface; a second end region of said branch signal channels including a signal reflecting means; said wave signal forming a plurality of branch wave signals; said branch wave signals traversing a path within said branch signal channels from said radiating elements towards said reflecting means, and from said reflecting means oppositely directed towards said first end region; adjustment means individually controlling the characteristics of each of said reflecting means whereby the phase of said branch wave signal at each of said first end regions may be individually varied; said radiating elements adjacently located in a first and second direction to define a generally planar region of said reflecting surface; said signal feed positioned without said generally planar region, and in a wave signal illuminating relationship therewith; the additive phase effect of said branch wave signals establishing an antenna beam orientation with respect to said signal feed in the manner of a parabolic reflector; said radiating elements forming a matrix defined by orthogonally related axes; the location of each of said radiating elements being referable to the origin of said orthogonally related axes; scan control means associated with each of said orthogonally related axes to present sequentially related digital control signals to said adjustment means.*

*5. A radio frequency antenna system comprising a reflector assembly; a feed element directed toward said assembly and spaced therefrom a distance between approximately one-half and one-quarter the maximum dimension of said assembly; a radio frequency transmission means connected to said feed element and adapted to be connected to antenna utilization apparatus, said assembly comprising a plurality of elemental reflector units each having a horn antenna, an electrically controllable phase control element connected to said horn antenna by waveguide transmission line to modify a signal received by said horn antenna, and signal reflecting means connected to receive the modified signal from said horn antenna and phase control element and return it for transmission from said horn antenna; said horn antennas arrayed in a closely spaced relationship to capture substantially all of the energy from said signal feed element which intercepts the*

*array of horn antennas, and means for transmitting a set of control signals to the respective phase control elements to provide predetermined phase shifts of respective portions of the wave front impinging on said reflector assembly.*

References Cited

The following references, cited by the Examiner, are of record in the patented file of this patent or the original patent.

UNITED STATES PATENTS

| | | | |
|---|---|---|---|
| 2,908,002 | 10/1959 | Van Atta | 343—776 |
| 2,566,703 | 9/1951 | Iams | 343—755 X |

| | | | |
|---|---|---|---|
| 3,045,237 | 7/1962 | Marston | 343—754 |
| 3,056,961 | 10/1962 | Mitchell | 343—854 |
| 2,986,734 | 5/1961 | Jones et al. | 343—854 |

FOREIGN PATENTS

| | | | |
|---|---|---|---|
| 860,826 | 2/1961 | Great Britain | 343—753 |

ELI LIEBERMAN, Primary Examiner

U.S. Cl. X.R.

343—778, 854